No. 642,294. Patented Jan. 30, 1900.
C. A. CALVERT.
COFFEE HULLER.
(Application filed Nov. 20, 1897.)
(No Model.)
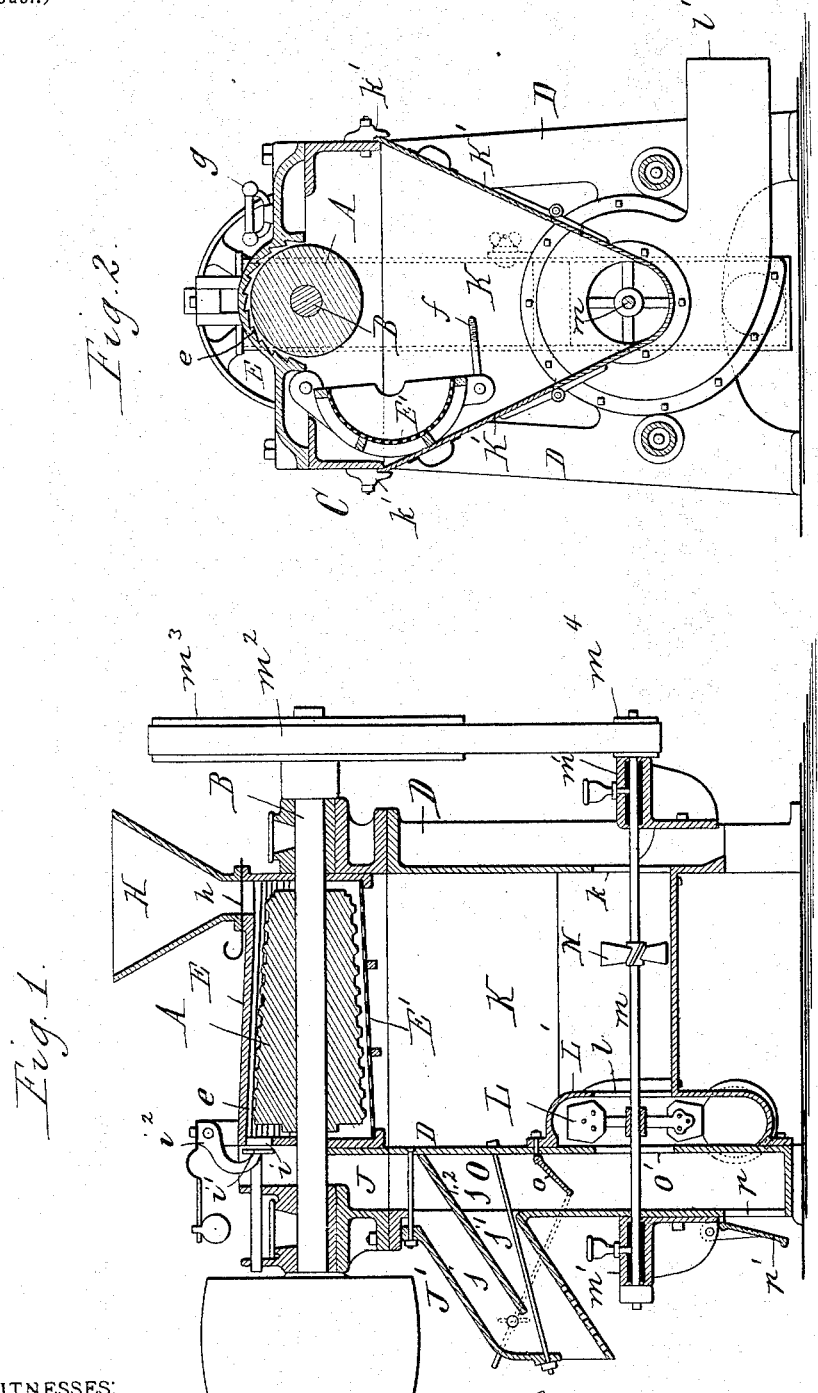
WITNESSES:
Chas. F. Burkhardt
Henry L. Deck
Charles A. Calvert INVENTOR.
By Wilhelm Bonner
ATTORNEYS.
THE NORRIS PETERS CO., PHOTO-LITHO., WASHINGTON, D. C.

UNITED STATES PATENT OFFICE.

CHARLES A. CALVERT, OF BUFFALO, NEW YORK, ASSIGNOR TO THE GEORGE L. SQUIER MANUFACTURING COMPANY, OF SAME PLACE.

COFFEE-HULLER.

SPECIFICATION forming part of Letters Patent No. 642,294, dated January 30, 1900.

Application filed November 20, 1897. Serial No. 659,245. (No model.)

*To all whom it may concern:*

Be it known that I, CHARLES A. CALVERT, a citizen of the United States, residing at Buffalo, in the county of Erie and State of New York, have invented new and useful Improvements in Coffee-Hullers, of which the following is a specification.

This invention relates to that class of coffee-hulling machines comprising, essentially, a shell or casing which is provided on its inner surface with teeth or corrugations and which has its lower portion constructed in the form of a screen; a rotary hulling drum or cone arranged in the casing and having ribs or teeth which coöperate with the teeth of the casing; an exhaust chamber or receptacle arranged underneath the casing for receiving the hulls, dust, &c., which pass through the perforated bottom of the casing; an air or suction leg for separating from the coffee any remaining dust and hulls which are discharged from the casing with the berries, and a suction-fan connected with said leg and said receptacle.

The objects of my invention are to so construct the machine as to afford ready access to the screen or perforated bottom of the casing for cleaning the same; and to combine the suction-fan with the exhaust-chamber and the separating-leg in a more compact manner.

In the accompanying drawings, Figure 1 is a longitudinal sectional elevation of my improved coffee-huller. Fig. 2 is a transverse section thereof.

Like letters of reference refer to like parts in both figures.

A is the milling drum or cone, which is mounted on the horizontal driving-shaft B. The latter is journaled in suitable bearings arranged on a housing or horizontal frame C, which is firmly secured to the upper ends of the supporting legs or standards D of the machine. The hulling-drum has the usual spiral ribs or teeth on its surface and is arranged in a shell or casing which is preferably composed of separate sections or halves E E'. The upper section or concave is formed on a plate which is rigidly secured to the top of the stationary housing C and is provided on its inner side with teeth or corrugations $e$, which coöperate with the ribs or teeth of the rotary hulling-drum in a well-known manner. The lower section or concave of the casing is perforated and consists of a skeleton frame covered with wire-cloth or perforated metal. This perforated section is preferably pivoted at one side to the upper section or to the housing C and is supported at its opposite side by vertical rods $f$, passing upwardly through openings formed in the plate of the upper section and provided at their projecting ends with removable hand-nuts $g$, which bear upon said plate, so that upon removing these nuts the lower section is allowed to swing downwardly or away from the under side of the hulling-drum, thereby permitting the removal of nails or other hard foreign substances which may enter the casing and also affording convenient access to the inner side of the perforated section for cleaning the same.

H is the feed-hopper, connected with the head of the casing and having the usual regulating slide or cut-off $h$.

$i$ is the elevated discharge-opening, arranged at the tail end of the casing, and $i'$ the valve applied to said opening for retarding the discharge of the coffee therefrom. In the construction shown in the drawings this valve has a horizontal stem, which is guided in bearings or standards formed on the adjacent bearing of the driving-shaft B, and the valve is held against its seat by a weighted elbow-lever $i^2$, pivoted to the upper section of the casing.

J is an upright stationary discharge-tube arranged at the tail end of the casing and receiving the hulled coffee from the latter, and J' is a discharge-spout connected with the lower end of said tube.

K is the trough or exhaust-chamber, arranged underneath the casing of the hulling-drum and extending upwardly to the housing C. This trough extends from end to end of the casing and is open at its upper end, so as to receive the hulls, dust, &c., falling through the perforated bottom of the casing. The trough is provided in the lower portion of its outer or front wall with an air-inlet opening $k$, but is otherwise closed on all sides. The upper portions of the side walls of the trough are constructed in the form of doors K', so that upon opening the same access is had to the interior of the trough for cleaning the perforated lower section of the casing. These doors are preferably hinged at their lower edges, so as to swing outwardly when opened, and they are held in their closed position by turn-buttons $k'$ or other suitable means.

L is a suction-fan which is preferably arranged at or near the lower rear end of the trough or exhaust-chamber K and whereby the chaff, &c., is withdrawn from the latter and discharged from the machine. The casing $L'$ of this fan has one of its eyes $l$ connected with the exhaust-chamber, so that the chaff is drawn into and through the fan-casing and expelled through the spout $l'$ thereof into the atmosphere. The fan is mounted upon a transverse shaft $m$, supported in bearings $m'$, and is driven from the main shaft B by a belt $m^2$, running around pulleys $m^3$ $m^4$, secured to said shafts.

N is an auxiliary fan or propeller arranged in the lower portion of the trough or exhaust-chamber K near the front end thereof and preferably mounted on the fan-shaft $m$. This auxiliary fan or propeller throws toward the eye of the main fan any chaff, &c., which settles in the exhaust-chamber out of range of the main fan, thus removing the chaff from all portions of the trough.

O is an upright leg or air-trunk arranged underneath the discharge-tube J. The discharge-spout $J'$, which forms an inclined continuation of the tube J, is divided into an upper passage $j$ and a lower passage $j'$ by a partition $j^2$, which extends from the front wall of the leg O nearly to the lower end of the discharge-spout. The upper end of the leg O communicates with the upper end of the lower passage $j'$, as shown in Fig. 1. The lower portion of the leg communicates with the adjacent eye of the fan-case by an opening $O'$, so that an air-current is drawn upwardly through the lower passage $j'$ of the discharge-spout and downwardly through the leg to the eye of the fan. This lower passage $j'$ of the discharge-spout forms the ascending upper portion of the air-separator, and the separation of the dust and chaff accompanying the berries is effected in this passage by the air-current which flows inwardly and upwardly through this passage and then downwardly through the leg to the fan. The coffee falls through this air-current in flowing from the lower end of the partition $j^2$, and any light impurities which accompany the berries are intercepted and conveyed to the fan by this air-current.

The separating-leg is provided with a valve or gate $o$ for regulating the draft through the same. This valve may be adjusted and held in position by any suitable or well-known means. Stray or broken coffee-beans are liable to be carried into the separating-leg, and in order to enable the same to be removed from time to time the leg is provided in its lower portion with an opening or hand-hole $p$. This opening effects the operation of the separating-leg, and in order to obtain the best results a valve $p'$ is applied to this opening, which should be kept partly open during the operation of the machine, as shown in Fig. 1.

In the operation of the machine the coffee fed into the casing from the hopper H is subjected to the hulling action of the rotary hulling-drum and is gradually propelled toward the tail end of the casing by the spiral arrangement of the ribs or teeth on the drum in a well-known manner, the hulled coffee escaping through the discharge-opening $i$ of the casing into the discharge-tube J and thence through the spout $J'$. The detached hulls and dust fall through the perforated bottom of the casing into the exhaust-chamber or trough K, from which they are withdrawn by the fan L and discharged through the fan-case and its spout. The fan at the same time produces an upward air-current through the lower passage of the discharge-spout and a descending current through the separating-leg O, whereby any light impurities still remaining in the hulled coffee are removed from the same as it flows through the spout. The same fan thus serves to carry off the chaff delivered into the exhaust-chamber and to effect the final separation of the light impurities from the coffee after the same leaves the hulling-case. By arranging the fan between the separating-leg and the exhaust-chamber, as shown, a very compact construction of these parts is obtained.

I claim as my invention—

1. The combination with the hulling-drum and its perforated casing having a discharge-spout for the hulled grains, of an exhaust-chamber arranged underneath the casing and receiving the chaff therefrom, an air-separator arranged on one side of said exhaust-chamber and having an upper portion through which the air-current ascends and through which the grains pass from said discharge-spout and a lower portion through which the air-current descends, and a fan and fan-case arranged between the bottom portion of said exhaust-chamber and the lower portion of the air-separator and having one of its eyes connected with the bottom portion of said exhaust-chamber and the other eye connected with the lower portion of said air-separator, substantially as set forth.

2. The combination with the hulling-drum and its perforated casing, of an exhaust-chamber arranged underneath the casing and receiving the chaff therefrom, a fan-case and fan arranged at one side of the exhaust-chamber and having its eye connected with the same immediately above the bottom thereof, an air-inlet arranged in the opposite side of the exhaust-chamber, and an auxiliary fan-wheel arranged in the bottom portion of said exhaust-chamber near said inlet and constructed to propel the material toward the eye of the fan, whereby all the solid material which passes through the perforated casing of the hulling-drum is conducted to the eye of the fan, partly by gravity and partly by the air-currents set in motion by the fan and the fan-wheel, substantially as set forth.

3. The combination with the hulling-drum, of a concave inclosing the upper portion of the drum, a housing and stationary frame in which the drum is journaled and on which said concave is supported, a fixed receiving-chamber extending downwardly from said stationary frame and provided in its upper portion with doors, and a perforated, pivoted concave, movable within said fixed chamber and inclosing the lower portion of the hulling-drum, said perforated concave being pivoted at one side and supported at the opposite side by releasable fastenings, whereby said perforated concave can be swung down on its pivoted connections within said fixed chamber and access can be had through the doors of said fixed chamber to the hulling-drum and to the inner and outer sides of the perforated concave, substantially as set forth.

Witness my hand this 5th day of October, 1897.

CHARLES A. CALVERT.

Witnesses:
 JNO. J. BONNER,
 KATHRYN ELMORE.